(12) United States Patent
Poulsen

(10) Patent No.: US 7,050,278 B2
(45) Date of Patent: May 23, 2006

(54) MOTOR CONTROLLER INCORPORATING AN ELECTRONIC CIRCUIT FOR PROTECTION AGAINST INRUSH CURRENTS

(75) Inventor: Joern Poulsen, Soenderborg (DK)

(73) Assignee: Danfoss Drives A/S, Graasten (DK)

( * ) Notice: Subject to any disclaimer, the term of this patent is extended or adjusted under 35 U.S.C. 154(b) by 381 days.

(21) Appl. No.: 10/442,473

(22) Filed: May 21, 2003

(65) Prior Publication Data

US 2003/0218838 A1 Nov. 27, 2003

(30) Foreign Application Priority Data

May 22, 2002 (DK) ................. PA 2002 00786

(51) Int. Cl.
*H02H 7/08* (2006.01)
(52) U.S. Cl. ........................... 361/31; 318/784
(58) Field of Classification Search ............. 318/784; 361/31; 323/908
See application file for complete search history.

(56) References Cited

U.S. PATENT DOCUMENTS

| | | | | |
|---|---|---|---|---|
| 4,769,752 A | * | 9/1988 | Rackowe | 363/56.11 |
| 5,568,041 A | * | 10/1996 | Hesterman | 323/207 |
| 5,689,130 A | * | 11/1997 | Okabe et al. | 257/342 |
| 5,714,846 A | * | 2/1998 | Rasch et al. | 315/225 |
| 5,838,181 A | * | 11/1998 | Hesterman | 327/175 |
| 5,930,130 A | * | 7/1999 | Katyl et al. | 363/53 |
| 6,055,167 A | * | 4/2000 | Shamkovich et al. | 363/52 |
| 6,445,165 B1 | * | 9/2002 | Malik et al. | 323/222 |
| 6,690,250 B1 | * | 2/2004 | Møller | 333/181 |
| 6,737,845 B1 | * | 5/2004 | Hwang | 323/284 |
| 6,744,612 B1 | * | 6/2004 | Chen | 361/58 |

FOREIGN PATENT DOCUMENTS

| | | |
|---|---|---|
| DK | 2000 01837 | 6/2002 |
| EP | 0 930 695 | 6/2000 |
| JP | 02-155477 | 6/1990 |
| SU | 1658344 | 6/1991 |

* cited by examiner

Primary Examiner—Lynn Feild
Assistant Examiner—Michael Rutland-Wallis
(74) Attorney, Agent, or Firm—McCormick Paulding & Huber LLP

(57) ABSTRACT

Inrush currents in the dc intermediate circuit of a motor controller necessitate the incorporation of protection circuits. These circuits usually take the form of a resistor inserted in series with the intermediate circuit, and the resistor is short-circuited after completion of inrush by a switch positioned in parallel with the resistor. To reduce cable-transmitted electrical noise an earthed noise-decoupling capacitor is added to the intermediate circuit, but it also requires protection against inrush currents. To minimise the number of components, a protection circuit is described which combines noise filtration and inrush protection. According to the invention, the inrush resistor has the form of a resistor network and is connected to a switch which via a controller alters the resistance of the resistor network, so that when the switch is open, the resistance to a differential current is greater than the resistance to a common mode current, and when the switch is closed, there is greater resistance to a common mode current than to the differential current.

11 Claims, 2 Drawing Sheets

MOTOR CONTROLLER INCORPORATING AN ELECTRONIC CIRCUIT FOR PROTECTION AGAINST INRUSH CURRENTS

CROSS-REFERENCE TO RELATED APPLICATIONS

This application is entitled to the benefit of and incorporates by reference essential subject matter disclosed in Danish Patent Application No. PA 2002 00786 filed on May 22, 2002.

FIELD OF THE INVENTION

The invention relates to an electronic circuit, which is installed as protection in a dc intermediate circuit in a motor controller such as a frequency converter, where protective measures are required due to large starting currents in the intermediate circuit. Protection is especially applicable to the intermediate capacitor, but the noise-decoupling capacitors used in RFI (Radio Frequency Interference) filters can also be damaged during the start up sequence.

BACKGROUND OF THE INVENTION

In frequency converters for speed regulation of electric motors, pulse width and pulse amplitude modulation of power semiconductors is extensively used. A side effect of this modulation is the generation of conductor transmitted radio noise. The standard EN 55011 describes limit values for emission of radio noise for devices generating electric noise. The noise occurs typically in the range of several kHz up to about 30 MHz. Compliance with these limit values can be achieved by installing or connecting an RFI filter. When designing an RFI filter for a frequency converter, it should be taken into account whether the rectifier is controlled or uncontrolled, as likewise the switching frequency of the inverter should be taken into consideration. The length of the motor cables is also an important design parameter. RFI filters can be connected to the output of the frequency converter, installed in the intermediate circuit, or installed on the mains side.

However, the use of RFI filters causes problems when at the same time a fault current circuit breaker is installed on the mains side of the frequency converter. Heavy-duty RFI filters mounted on the mains side have one or more earthed (PE, Protective Earth) capacitors, which are so large, that the fault current circuit breaker is triggered during start up. RFI filters installed in the intermediate circuit can also cause activation of the fault current circuit breaker. This problem can be solved by using fault current circuit breakers with a higher trip current or by using fault current circuit breakers with delay circuits, so that pulses of short duration will not cause triggering.

Alternatively, the problem of unwanted triggering of the fault current circuit breaker can be solved by designing the RFI filter in such a way as to reduce the earth leakage current. For example, EP 0 930 695 describes an RFI filter connected to the mains side, which enables connection of a frequency converter to a fault current circuit breaker.

The RFI filter designer faces another problem, namely the use of symmetrically and asymmetrically earthed mains supplies. In symmetrically earthed mains supplies, the star point of the three phases is connected to earth, which is the prevailing convention in Europe. Asymmetric main supplies are often used in the USA, where one of the three phases is earthed, a so-called delta-earthed mains supply. Frequency converters on asymmetric mains supplies can cause considerable earth leakage currents, and will trigger a fault current circuit breaker more often than frequency converters connected to symmetric mains supplies. In our experience, connection of a frequency converter to an asymmetric mains supply occurs in approximately 10% of cases.

As previously mentioned, the noise-decoupling capacitors in the RFI filters cause inrush currents to earth. Another inrush current is that which runs through the intermediate capacitor during start up. Protection of the intermediate capacitor is described in JP 02155477 A, where a resistor is inserted in series with the intermediate capacitor. A relay is placed in parallel with the resistor, and the relay is held open by a controller during start up, and closed during operation.

SU 1658344 describes a frequency converter, which in its intermediate circuit contains two capacitors connected in series between the positive and negative conductor. From the midpoint of the capacitor, a PTC (Positive Temperature Coefficient) resistor is connected to earth. The function of the resistor is to limit the large start up current drawn by the capacitor. Because the resistance is very low during start up, the capacitor connected to the negative conductor can be regarded as short-circuited, thus limiting the charging current. As the temperature rises, the resistance becomes so great that its presence has no influence during operation. However, SU 1658344 does not describe the problems associated with the use of fault current circuit breakers in combination with frequency converters, and the PTC solution used in SU 1658344 will most probably result in such a large flow of current to earth, that the undesired triggering of a fault current circuit breaker will occur.

For the most part, known methods describe protection of the intermediate capacitor. In the Danish patent application PA 2000 01837, the applicant has described a circuit comprising an inrush resistor inserted in series with a noise-decoupling capacitor in the intermediate circuit, and a switch is connected in parallel with the resistor. This resistor attenuates the common mode current, i.e. the current flowing through both positive and negative conductors and thereafter to earth. The common mode current can consist of noise current from the inverter or so-called surge pulses from the mains supply. A second switch is connected to a second inrush resistor in series with two intermediate capacitors, and a switch is connected in parallel with the resistor. The purpose of the resistor is to attenuate the differential current during start up, i.e. the current that flows from the positive to the negative conductor. However, a disadvantage of the circuit is the requirement for two relays. The physical dimensions of these relays are large, which is undesirable since the tendency for frequency converters is towards ever-smaller motor controllers.

On the basis of the above, the object is to develop a protection circuit for the dc intermediate circuit, which protects both the intermediate capacitor and noise-decoupling capacitor, and requires less physical space than hitherto.

SUMMARY OF THE INVENTION

In a motor controller containing an electronic circuit for protection against inrush currents in a dc intermediate circuit, where the circuit is inserted in series with an intermediate capacitor and incorporates an inrush resistor and a switch which is controlled by a controller, the object is reached in that the circuit additionally incorporates a noise-decoupling capacitor which directs noise currents to earth, that the inrush resistor is constructed as a resistor network connected to the switch, and that the controller alters the resistance of the resistor network via the switch, such that when the switch is open, the resistance towards a differential current is greater than the resistance towards a common mode current, and that the resistance upon closure of the switch is greater towards the common mode current than towards the differential current.

By designing a passive protection circuit as described, it is possible to minimise the number of electronic components required to make a circuit combining noise filter and inrush protection. The circuit protects both the intermediate capacitor and the noise-decoupling capacitor against excessive inrush currents, and simultaneously functions as a noise filter during both start up and normal operation. When the switch is open, the resistor network has one effective resistance towards inrush and noise currents, whereas upon closure of the switch, the network has a different effective resistance. The network exhibits differing resistance dependent upon whether the current is common mode current or differential current.

The invention has another advantage, namely that a motor controller employing the circuit will be more robust against surge voltages. Prior to final delivery, the manufacturer of the motor controller tests the apparatus by forcing a high common mode voltage of 4 kV between the mains and earth. This normally causes a high peak voltage through the noise-decoupling capacitor, but by ensuring that a resistor is always placed in series with the capacitor, a reduction in the amplitude of the peak voltage is achieved.

The resistor network has the advantage of a continued attenuation effect after closure of the switch. The invention hereby differs from prior art whereby an inrush resistor no longer has an active electronic role after the switch is closed. It is completely short-circuited, as a rule. The attenuation effect of the resistor network after closure of the switch applies to the common mode current, but not to the differential current, and is important in attenuation of undesired cross talk in the motor controller. When the switch is open, the circuit functions as both a noise filter and inrush protection, whereas after closure of the switch it functions as a noise filter only.

The circuit can be constructed with a single switch connected to the intermediate capacitor. In this way savings are achieved in both cost and especially space, since the switch, when in the form of a relay, must be doubly insulated for safety reasons. Furthermore, only a single control signal is required, compared to the former requirement for at least two.

The intermediate capacitor can take the form of two capacitors, where the switch is positioned in series midway between the two capacitors, and where the resistor network is placed in parallel with the switch. This enables disconnection of the resistor network when desired.

By connecting the noise-decoupling capacitor to the midpoint between two resistors connected in series, and where these resistors again are connected to the midpoint between two capacitors, bridging from the positive to the negative busbar of the intermediate circuit, the noise-decoupling capacitor can be protected against high voltages. This means the option of a lower rated and thus cheaper component exists. In this way, the resistor network can be designed with two resistors only. The two resistors should preferably have the same value (R). If this is the case, the resistor network will exhibit a resistance of two times R towards the differential inrush current, and a resistance of half times R (_R) towards the inrush common mode current when the switch is open, whereas when the switch is closed the resistor network will exhibit zero times R towards the differential current and half R towards the noise current during normal operation. Dependent upon the switch settings, the resistor network thus exhibits a range of differing effective resistances towards different currents.

Furthermore, it is preferable that the resistor network is constructed such that resistance towards the common mode current is lower after closure of the switch than before. The resistance is e.g. halved, hereby enhancing the noise attenuation effect of the noise-decoupling capacitor.

This becomes especially apparent if the resistors are constructed as NTC resistors. With rising temperature, the effective resistance of the resistor network falls, which is especially advantageous after closure of the switch since it improves the effectiveness of noise filtering.

The controller, typically the motor controller's micro controller, closes the switch preferably when the intermediate capacitor is charged. At this point, the inrush sequence is completed, and the normal operation phase commences.

It is advantageous to connect an additional noise-decoupling capacitor from the positive busbar of the intermediate circuit to earth. In this way, the protection circuit can be used with both ordinarily earthed and asymmetrically earthed mains supplies. For mains supplies with asymmetric earth connection, the switch is held open during both start up and operation, whereas for ordinary mains supplies, the switch is preferably kept closed during operation. It is therefore unnecessary for the manufacturer to provide two versions of the combined noise and protection circuit. Instead, the circuit can be adapted to the mains supply at the end user's location, using a jumper, for example.

To achieve the best possible attenuation of cable-transmitted radio noise, noise should be filtered on both the mains side and in the intermediate circuit. Noise filtering on the mains side is achieved by connecting a minimum of two capacitors in series from the supply cable to earth. The first capacitor, which is connected to earth, is coupled in parallel with a switch that is held open during inrush. In this way the first capacitor functions as inrush protection. If desired, a resistor can be connected in parallel with the switch, and with the first capacitor. By having filter and inrush protection on the mains side and in the intermediate circuit, a two-stage noise filter is achieved. The same controller can conveniently activate the switches simultaneously.

The switches that have been described are mainly relays, but transistors could also be used.

BRIEF DESCRIPTION OF THE DRAWINGS

The invention is now described in the light of the two figures, where.

DETAILED DESCRIPTION OF THE PREFERRED EMBODIMENTS

Figure 1:
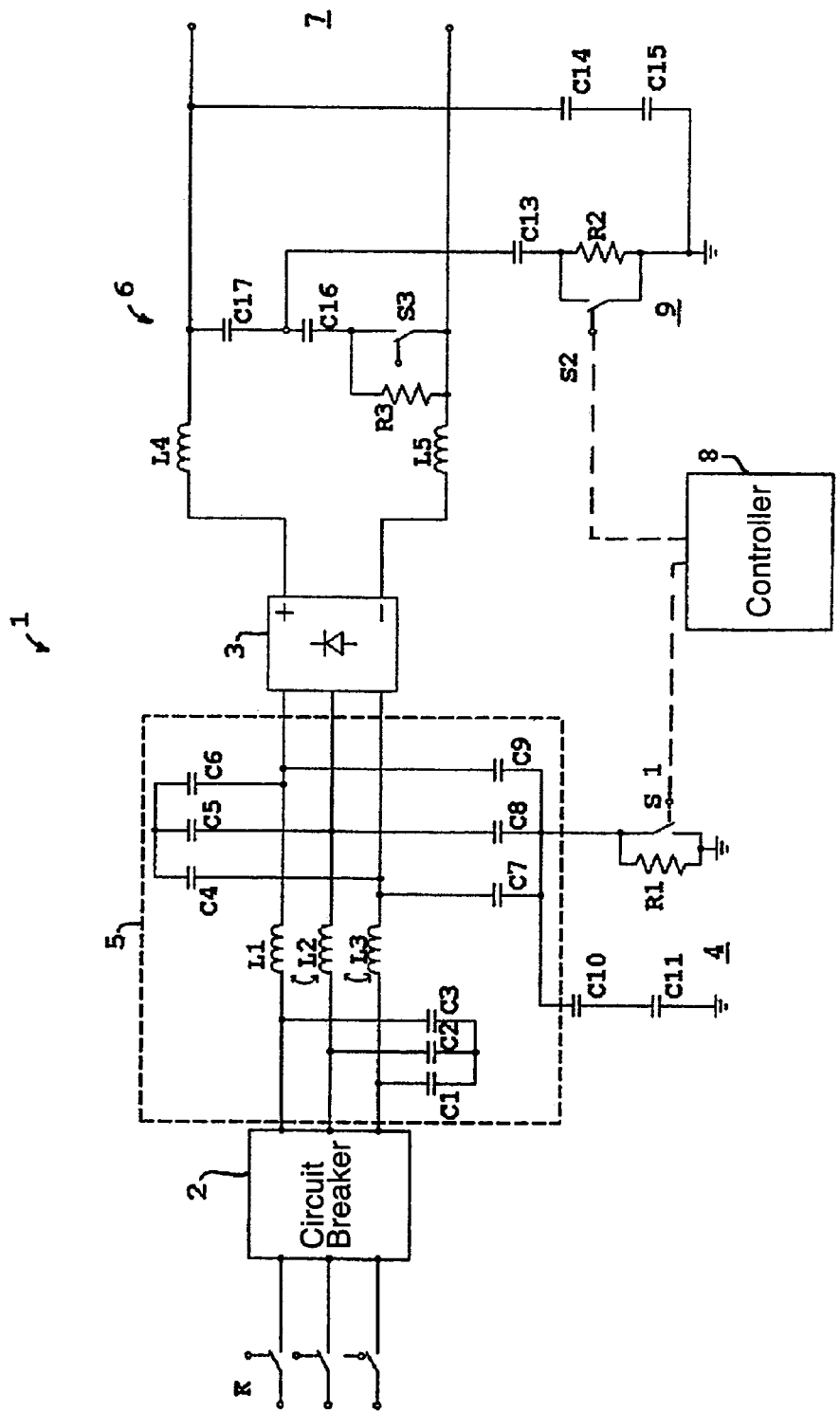
FIG. 1 shows an earlier protection and filter circuit designed by the applicant

FIG. 1 shows a circuit for inrush protection and noise filtration as described in the applicant's patent application PA 2000 01837. Reference number 1 indicates the mains section and the input section of a frequency converter. On the mains side, a voltage source (not illustrated) is connected to the switches K, which are then connected to a fault current circuit breaker 2, through which three phases pass to the input of the frequency converter. The capacitors C1, C2 and C3 are connected to the phase conductors at one pole, and at the other pole they are connected in a common star point. They function in a conventional manner to attenuate differential noise. Capacitors C4, C5 and C6 have the same role. On each phase between the two sets of capacitors, a coil (L1, L2 and L3) is positioned, functioning as a common mode coil. These three coils are wound on a common ferrite core. The capacitors C7, C8 and C9 branch out from the supply conductors, and function as noise-decoupling capacitors joined in a common star point. Each set of coil L and capacitor C forms an LC noise attenuation filter. Emerging from the star point of the capacitors is a parallel connection of the resistor R1, the relay S1 and the series connection C10 and C11. C10 and C11 can also be replaced by a single capacitor, but on asymmetrically earthed mains supplies, where S1 must be held open, high voltages exceeding the voltage specification for the individual capacitor can arise in the star point. This parallel circuit—commonly denoted 4—is earthed. Box 5 indicates the components which function as a passive RFI filter on symmetrically earthed mains supplies during normal operation. In this embodiment the rectifier 3 is uncontrolled, but a controlled rectifier can also be used. After the rectifier 3, which converts alternating current to a pulsating direct current, which passes through to the dc intermediate circuit 6, follows coil L4. Its main purpose is to attenuate the $5^{th}$, $7^{th}$ and $9^{th}$ harmonics of the current during operation to avoid mains retroaction, but it has also proved to reduce radio noise. This coil is therefore mirrored by L5 in the negative busbar of the dc bus. The intermediate capacitor consists of two capacitors, C16 and C17, connected in series, and the noise-decoupling capacitor C13 is connected at their common midpoint. The potential of this midpoint is almost at earth level, and the advantage of this construction is that capacitor C13 is subjected to a lower voltage load than were it for example connected directly to the negative busbar. This means that a lower-rated capacitor can be used. An inverter (not shown) is connected to the output 7. A controller, 8, determines whether the switches S1 and S2 may be closed, which should not occur in the event of asymmetric mains supply. Via the control panel of the frequency converter, the operator can enter information into controller 8 about the type of mains, which frequency converter, RFI filter and fault current circuit breaker are connected to. Alternatively, the operator can set a jumper placed at the relay, where the jumper determines whether or not the relay should close.

When the switches K at the input of the fault current circuit breaker are closed, the inrush sequence begins. Due to their size, the capacitors C7, C8 and C9 will sink a large current. Had their star point been directly earthed, this current would be sufficient to trigger the fault current circuit breaker. An ordinary fault current circuit breaker is triggered at about 0.5 A whereas a high sensitivity fault current circuit breaker is triggered at a current as low as 30 mA. However, the star point is connected to the parallel circuit 4, and the capacitors C10 and C11 are dimensioned so small in comparison to C7, C8 and C9, that they have a strong limiting effect upon the amplitude of the leakage current and the duration of the current pulse. C10 and C11 are for example 220 nF in size, whereas C7, C8 and C9 are 1 μF. The resistor R1 (100 kohm) also has the function of equalizing the potential in the star point before the relay S1 closes. During start up the peak voltage over S1 will lie in the range 200–500 V, but C10 and C11 are discharged through R1, so the final voltage across R1 will be close to 0V and thus will not damage S1. In certain circumstances it has been shown that R1 can even be omitted. During the start up phase the switch S1 is open, so the parallel circuit of C10, C11 and R1 functions as inrush protection. The controller 8, which was activated almost simultaneously with closure of the switches K, has registered the time from start up, and after a predetermined time closes the switch on the relay S1. The switches then remain closed for the remainder of the frequency converter's operating time so that the true RFI capacitors C7, C8 and C9 are directly earthed, and the full filter effect is achieved. To save retaining energy, use a bistable relay at S1.

Protection against triggering of the fault current circuit breaker due to earth leakage current in the intermediate circuit of the frequency converter is provided by parallel circuit 9. When the switches K at the input to the fault current circuit breaker are closed, the inrush of the intermediate circuit in relation to ground commences. Due to its size, the capacitor C13 will draw a large current. If it were directly connected to earth, this current would be adequate to trigger the fault current circuit breaker. C13 is however connected in series with the parallel circuit of R2 and S2, where R2 functions as an ohmic choke during start up. The resistor R2 (100 kohm) is also positioned here to equalise the potential before closure of the switch S2. During the start up phase the switch S2 is open, so R2 can act as an inrush limiter. The controller 8 has registered the time since start up, and after a period approximately corresponding to the charging time of the capacitor C13, the switch on relay S2 is closed. The switches then remain closed for the remainder of the operating period, so that the true noise-decoupling capacitor C13 is directly connected to earth, and the full filter effect is achieved. If desired, resistor R2 and relay S2 can of course swap positions with the capacitor C13. In order to save retaining energy, the switch S2 can be placed in the same relay as the switch S1.

The protection circuit in the intermediate circuit shown in FIG. 1 functions as intended, but unfortunately occupies a relatively large volume due to the two relays and the requirement for two control signals. In addition, when the switch is closed, the noise-decoupling capacitor C13 is attenuated only by parasitic resistors in the conductors.

Figure 2:
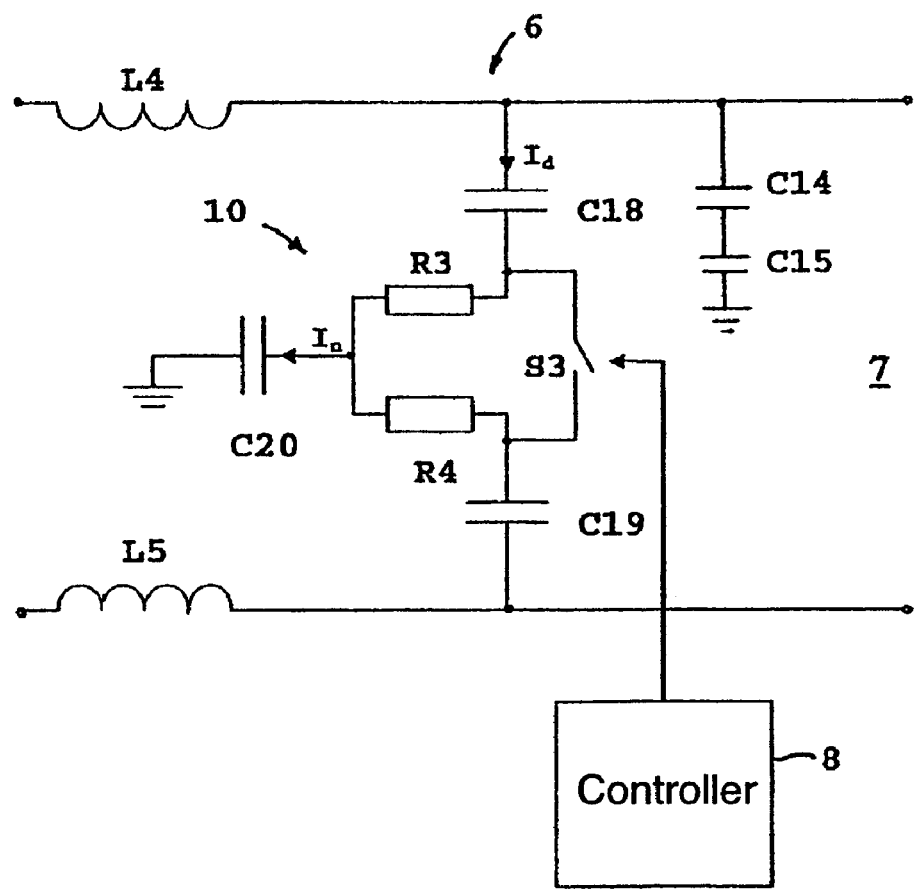
FIG. 2 shows an example of an embodiment of the invention

FIG. 2 shows an embodiment of the invention with the inventive protection circuit 10 positioned in the intermediate circuit.

The intermediate capacitors C18 and C19 are respectively connected to the positive and negative conductors of the intermediate circuit. The two capacitors are connected by a resistor network comprising two resistors R3 and R4, placed in series with the capacitors. From the midpoint between the two resistors, a noise-decoupling capacitor C20 is connected to earth. One pole on the switch S3 is connected to a pole of the capacitor C18, whereas the other pole on the switch is connected to a pole on the capacitor C19. The controller 8 controls opening and closing of the switch S3 and also the switch S1 as shown in FIG. 1. The protection circuit comprises components R3, R4 and S3. R3 and R4 are assumed to be of equal rating. When the switches K are closed at the input, the inrush sequence begins in relation to earth and in relation to the negative conductor. The switch S3 is held open, and the inrush current flowing through the capacitors C18 and C19 is attenuated by the sum of the resistors R3 and R4. At the same time, the parallel circuit of R3 and R4 attenuates the inrush current to earth and protects the noise decoupling capacitor C20. The two resistors thus function simultaneously as inrush protection for the ordinary intermediate capacitors and for the noise-decoupling capacitors.

Once the intermediate capacitors are charged, the controller 8 closes the switch S3 and the intermediate capacitors are connected directly in series. In contrast to traditional inrush protection, the inrush resistor is not deactivated, but remains an active part of the circuit. The closure of S3 results in a common mode value of half the inrush resistors R3 and R4. The resistors can be made with NTC resistors causing a reduction in the effective resistance of the resistor network to leaking earth currents from start up to operation. This is also desirable, because high resistance during start up and lower resistance during operation are exactly what is wanted. The lower the parallel value of R3 and R4 is during operation, the better the diversion of the cable-borne noise currents. On the other hand, a certain ohmic attenuation of noise currents is desirable, since inductive disturbance can otherwise arise, and furthermore, the noise-decoupling capacitors will be protected in the event of applied surge pulses.

Cross talk occurs as a result of aiming to build the frequency converter as small as possible, which leads to close proximity of noise-attenuated wiring (connections, printed cupper strips, etc.) and noise-source wiring. This leads to transmission of noise, but noise attenuation can be achieved by placing a resistor in series with the noise-decoupling capacitor C20, just as C20 can consist of two capacitors connected in series. In certain circumstances an extra attenuating resistor can be inserted in series with C20. As in FIG. 1, the capacitors C14 and C15 enable operation on an asymmetric mains supply, where the switch S3 must be held open both during start up and operation.

In FIG. 2, typical values for the components are as follows: R3 and R4 are set to 15Ω and the noise-decoupling capacitor C20 to 100 nF.

The intermediate capacitors lie typically in the range 470–1000 µF.

The resistors R3 and R4 have preferably fixed values but can as mentioned also take the form of NTC resistors, so their ohmic resistance decreases with increasing temperature. This gives greater attenuation of radio noise. However the use of NTC resistors can be problematic when long motor cables are used, leading to heating of the NTC resistors. Heating leads to a reduction in resistance, and if the motor controller is shut down, then started up again shortly afterwards, the inrush resistance will be undesirably lower than intended. The solution here is to design R3 and R4 as a fixed resistor in series with an NTC resistor respectively.

During normal operation, the components in box 5 (FIG. 1) and circuit 10 (FIG. 2) act as RFI filters. The resulting RFI filter in the frequency converter is made up of two stages, a first stage of second order on the mains side and a second stage of second order in the intermediate circuit. The effective filter is therefore of order 4. The RFI filters on the mains side and in the intermediate circuit can be described as having two working characteristics, where the first working characteristic gives a small RFI attenuation mechanism whilst the relay is open, whereas upon closure of the relay the RFI filter follows the other more attenuating working characteristic. The total noise attenuation during start up is approximately 40 dB, whereas it is approximately 60 DB during normal operation. Thus the RFI filters will only attain full efficiency on the second working characteristic, but this is not important since there is essentially no radio noise before the inverter begins operation.

The invention is described using a relay as switch, but a transistor switch could also be employed. A relay is however preferable, because the transistor in ON-state possesses a residual resistance which will reduce the RFI attenuating performance during operation.

What is claimed is:

1. An electronic circuit for protection against inrush currents, the circuit comprising:
   an inrush resistor;
   a switch, which is controlled by a controller; and
   a noise-decoupling capacitor which diverts noise currents to earth;
   wherein the circuit is arranged in a DC intermediate circuit and inserted in series with an intermediate capacitor, the inrush resistor having the form of a resistor network connected to the switch, and wherein the controller via the switch alters the resistance of the resistor network, so that when the switch is open, the resistance to a differential current is greater than the resistance to a common mode current, and when the switch is closed, there is greater resistance to a common mode current than to the differential current.

2. The electronic circuit according to claim 1, wherein the circuit acts as both a noise filter and inrush protection when the switch is open, but as a noise filter only when the switch is closed.

3. The electronic circuit according to claim 2, wherein the circuit incorporates only one switch, and the switch is connected to the intermediate capacitor.

4. The electronic circuit according to claim 3, wherein the switch is connected in series between a first intermediate capacitor and a second intermediate capacitor, and that the resistor network is connected in parallel with the switch.

5. The electronic circuit according to claim 4, wherein the resistor network comprises two resistors connected in series and the noise-decoupling capacitor is connected between a midpoint common to the two resistors and earth.

6. The electronic circuit according to claim 1, wherein the resistance of the resistor network to the common mode current when the switch is closed, is lower than the resistance when the switch is open.

7. The electronic circuit according to claim 6, wherein one or more resistors in the resistor network are negative temperature coefficient resistors.

8. The electronic circuit according to claim 1, wherein the controller doses the switch immediately after the intermediate capacitor is charged.

9. The electronic circuit according to claim 1, further comprising:
   a further noise-decoupling capacitor connected to earth from a positive conductor of the intermediate circuit.

10. The electronic circuit according to claim 1, the circuit further comprising:
    an initial noise-decoupling capacitor placed prior to a rectifier; and
    a second noise-decoupling capacitor, which is connected to the initial noise-decoupling capacitor and to a supply line;
    wherein in parallel with the initial noise-decoupling capacitor a second switch is connected, which second switch is controlled by the controller.

11. The electronic circuit according to claim 1, wherein the switch is a relay or a transistor.

* * * * *

UNITED STATES PATENT AND TRADEMARK OFFICE
CERTIFICATE OF CORRECTION

PATENT NO. : 7,050,278 B2
APPLICATION NO. : 10/442473
DATED : May 23, 2006
INVENTOR(S) : Poulsen It is certified that error appears in the above-identified patent and that said Letters Patent is hereby corrected as shown below:

In Column 8, Claim 8, line 46, please delete "doses" and replace with --closes--.

Signed and Sealed this

Twelfth Day of September, 2006

JON W. DUDAS
*Director of the United States Patent and Trademark Office*